United States Patent [19]

Sasaki et al.

[11] Patent Number: 5,647,920
[45] Date of Patent: Jul. 15, 1997

[54] PROCESS FOR PREPARATION OF CORROSION-RESISTANT AND WEAR-RESISTANT ALLOY

[75] Inventors: Kyoichi Sasaki; Masaki Shimada, both of Numazu, Japan

[73] Assignee: Toshiba Kikai Kabushiki Kaisha, Tokyo-to, Japan

[21] Appl. No.: 151,771

[22] Filed: Nov. 15, 1993

Related U.S. Application Data

[63] Continuation of Ser. No. 730,810, filed as PCT/JP89/01310, Dec. 27, 1989 published as WO91/09980, Jul. 11, 1991, abandoned.

[51] Int. Cl.$^6$ .................................................... C21D 5/00
[52] U.S. Cl. ........................... 148/512; 148/516; 148/524; 148/525
[58] Field of Search ...................... 148/512, 516, 148/903, 524, 525, 320, 425, 426, 242; 75/236, 239, 242, 245, 246; 419/17; 428/627, 552; 427/190, 191

[56] References Cited

U.S. PATENT DOCUMENTS

| | | | |
|---|---|---|---|
| 3,642,519 | 2/1972 | Tiner et al. | 148/512 |
| 3,838,288 | 9/1974 | Stolz et al. | 148/512 |
| 3,869,319 | 3/1975 | Ishihara et al. | 420/10 |
| 4,155,759 | 5/1979 | Brown | 75/239 |
| 4,398,966 | 8/1983 | Kelly et al. | 148/512 |

FOREIGN PATENT DOCUMENTS

| | | |
|---|---|---|
| 2386380 | 11/1978 | France . |
| 58-181470 | 10/1983 | Japan . |
| 62-125636 | 6/1987 | Japan . |
| 62-207883 | 9/1987 | Japan . |
| 62-253758 | 11/1987 | Japan . |
| 63-90307 | 4/1988 | Japan . |
| 63-157796 | 6/1988 | Japan . |
| 2-197554 | 8/1990 | Japan . |
| 2023478 | 1/1980 | United Kingdom . |
| 2169318 | 7/1986 | United Kingdom . |

*Primary Examiner*—Sikyin Ip
*Attorney, Agent, or Firm*—Cushman Darby & Cushman, IP Group of Pillsbury Madison & Sutro, LLP

[57] ABSTRACT

Disclosed is a process for the preparation of an alloy having excellent corrosion resistance and wear resistance, which comprises subjecting a powdery mixture comprising a powder of at least one matrix metal selected from the group consisting of Fe-based alloys, Co-based alloys and Ni-based alloys and a vanadium carbide powder to a heat treatment, wherein by repeating fusion and re-fusion by a heat treatment using a heat source having a high energy density, a phase of uniform and fine vanadium carbide particles is recrystallized and/or redeposited in the matrix metal phase.

6 Claims, 10 Drawing Sheets

PROCESS FOR PREPARATION OF CORROSION-RESISTANT AND WEAR-RESISTANT ALLOY

This is a continuation of application Ser. No 07/730,810, filed as PCT/JP89/01310, Dec. 27, 1989 published as WO91/09980, Jul. 11, 1991, which was abandoned upon the filing hereof.

TECHNICAL FIELD

The present invention relates to an alloy material which is excellent in both of corrosion resistance and wear resistance, and a method for improving corrosion resistance and wear resistance of the surface of a metal member by using this alloy material.

BACKGROUND ART

As the means for improving the corrosion resistance and wear resistance of a metal member constituting a machine or apparatus, there has been adopted a method in which a constituent material such as stainless steel is quenched or the surface of a metal member is modified by deposition or the like.

Instead of the above-mentioned surface treatment method, there are recently proposed various methods in which specific hard particles are added to a metal material constituting a metal member. For example, Japanese Unexamined Patent Publication No. 58-181470 proposes a method in which hard particles of WC, NbC, TiC, CrC, VC or the like are added into a matrix metal composed of an Ni-based, Co-based or Fe-based alloy or to the surface of the base metal to improve the hardness or wear resistance of the matrix metal. We confirmed that this method is effective to some extent for improving the wear resistance but the method is still unsatisfactory in that the toughness of the alloy is reduced. For example, hard particles of NbC (having a melting point of 3480° C.) or TiC (having a melting point of 3180° C.) have a high melting point and they are hardly fusible. Therefore, it is difficult to avoid addition of the hard particles in the unfused state. Accordingly, hard particles are left in the matrix metal in the relatively large form at the step of forming a corrosion-resistant and wear-resistant layer, and these relatively large particles cause reduction of the toughness of the metal material.

Furthermore, even if the added carbide is fused in the matrix metal, the problem of embrittlement of the material often arises. For example, if MoC or WC is fused together with an Ni-based, Co-based or Fe-based alloy, as is well-known, a brittle compound of the $M_6C$ type is formed as a crystal. Formation of the crystal of the brittle compound does not make any contribution to improvement of the wear resistance but embrittles the matrix metal.

Japanese Unexamined Patent Publication No. 63-157796 discloses a method for the preparation of a roll for hot rolling. According to this method, it is intended to obtain a roll having a wear resistance, a crack resistance and a high toughness by adding a VC powder to a ferrous alloy. In this method, it is an indispensable requirement that the VC powder should be added in an amount of at least 10% by weight to the ferrous alloy. The object of this method is to improve the hardenability of the roll, but we confirmed that in the case where an Fe-type alloy is used as the base metal, when VC is added to this alloy, a plurality of kinds of carbides such as WC and CrC are inevitably formed in large quantities and the intended effect is not always attained. This method is irrelevant to the technique of re-crystallizing or re-depositing VC in a specific state, and the method is not effective for improving both of the wear resistance and corrosion resistance.

Furthermore, in the conventional methods, it is necessary to control the crystallization of the above-mentioned brittle compound by controlling the elevation of the temperature to a lowest level necessary for fusion bonding to the matrix metal at the addition of hard particles, and for this purpose, it is necessary to increase the particle size of the hard particles to be added more or less. However, if the particle size is increased, uniform dispersion becomes difficult and as the result, the toughness of the metal material is reduced. If coarse and distorted hard particles are present in the matrix metal, as pointed out hereinbefore, the wear resistance is reduced because these particles are readily dropped at a frictional movement.

The problem of the deviation of distribution of hard particles or falling of the hard particles caused by this deviation is made serious by the difference of the specific gravity between the matrix metal and hard particles. For example, in the case where an Fe-based alloy is used as the matrix metal and particles of $Al_2O_3$, SiC or TiC are used as the hard particles, agglomeration of the hard particles or deviation of the distribution is especially readily caused. When Cr carbide particles are used as the hard particles, the chromium carbide re-crystallized or re-deposited at the cooling step conducted after heating agglomerates and grows into coarse carbide grains, with the result that a problem of falling of hard particles often arises.

DISCLOSURE OF THE INVENTION

The present invention has been completed in view of the foregoing problems of the conventional techniques. It is therefore a primary object of the present invention to provide a corrosion-resistant and wear-resistant alloy in which hard particles are finely and uniformly distributed in a matrix metal without embrittlement of the matrix metal to prominently improve both of the corrosion resistance and wear resistance, and a process for the preparation of this alloy.

Another object of the present invention is to provide a method for modifying the surface of a metal member by forming a layer of the above-mentioned corrosion-resistant and wear-resistant alloy on the surface of the metal member, that is, a method for the preparation of a surface-modified metal member having improved corrosion resistance and wear resistance.

More specifically, in accordance with the present invention, there is provided a process for the preparation of a corrosion-resistant and wear-resistant alloy, which comprises subjecting a powdery mixture comprising a powder of at least one matrix metal selected from the group consisting of Fe-based alloys, Co-based alloys and Ni-based alloys and a vanadium carbide powder to a heat treatment, wherein by repeating fusion and refusion by a heat treatment using a heat source having a high energy density, a phase of uniform and fine vanadium carbide particles is recrystallized and/or redeposited in the matrix metal phase.

Furthermore, in accordance with the present invention, there is provided a process for the preparation of a surface-modified metal member having improved corrosion resistance and wear resistance, which comprises supplying a powdery mixture comprising a powder of at least one matrix metal selected from the group consisting of Fe-based alloys, Co-based alloys and Ni-based alloys and a vanadium carbide powder to the surface of a base material constituting the metal member and subjecting the powdery mixture to a heat treatment using a heat source having a high energy density to repeat fusion and re-fusion of the powdery mixture, whereby a built-up alloy layer comprising a phase of uniform and fine vanadium carbide particles recrystallized and/or redeposited in the matrix metal phase is formed on the surface of the base material.

BEST MODE FOR CARRYING OUT THE INVENTION

In the corrosion-resistant and wear-resistant alloy of the present invention, Fe-based alloys, Co-based alloys and Ni-based alloys having an excellent corrosion resistance are preferably used as the matrix metal. For example, as the corrosion-resistant Fe-based alloy, there can be used austenitic stainless steel, martensitic stainless steel and ferrite stainless steel.

As the corrosion-resistant Co-based alloy, there can be used stellite type Co alloys such as Co—Cr—W alloy and Co—Ni—Cr—W alloy.

As the Ni-based alloy, there can be used Hastelloy alloys, Inconel alloys and Colmonoy alloys, such as Ni—Cr—Si alloy and Ni—Cr—Fe—W alloys.

In the production of the alloy of the present invention, a vanadium carbide powder is added in an amount of up to 70% by weight to a powder of at least one matrix metal selected from the above-mentioned alloys to form a powdery mixture. VC is preferably used as the vanadium carbide powder.

The particle size of the VC powder is not necessarily critical, but in order to obtain a good dispersion state, it is preferred that the particle size of the VC powder be 60 to 100 μm.

The amount added of vanadium carbide is appropriately selected within the above-mentioned range of up to 70% by weight according to the intended wear resistance characteristics. However, in the case where the matrix metal is an Fe-based alloy, it is preferred that the amount of vanadium carbide be up to 10% by weight, especially up to 7.5% by weight.

In the case where the matrix metal is a Co-based or Ni-based alloy, the amount of vanadium carbide is preferably up to 70% by weight. In general, as the content of vanadium carbide increases, the wear resistance is improved, but if vanadium carbide is added in an amount exceeding the above-mentioned upper limit, addition in the unfused state is caused and no good results are obtained because of reduction of the toughness and reduction of the wear resistance owing to falling of the carbide.

In the present invention, the so-prepared powdery mixture is heat-treated by using a heat source having a high energy density, preferably in an atmosphere of an inert gas such as argon gas. By repeating fusion and re-fusion by the heat treatment using a heat source having a high energy density, a phase of uniform and fine vanadium carbide particles is recrystallized and/or redeposited in the matrix metal phase.

Specifically, the heat treatment is preferably accomplished by carrying out the following steps (a) and (b) continuously:

(a) the step of fusing a powdery mixture comprising a powder of at least one matrix metal selected from the group consisting of Fe-based alloys, Co-based alloys and Ni-based alloys and a vanadium carbide powder by using a first heat source having a high energy density and recrystallizing and/or redepositing a phase of uniform and fine vanadium carbide particles in a matrix metal phase; and (b) the step of re-fusing the phase of vanadium carbide particles in the matrix metal phase by using a second heat source having a high energy density and recrystallizing and/or redepositing a phase of uniform and fine vanadium carbide particles in the matrix metal phase.

The above first and second heat treatments can be carried out continuously, but they can be carried out discontinuously or intermittently so far as fusion and re-fusion are repeated.

In order to manifest a good crystallization and deposition state of the phase of vanadium carbide particles, it is important that cooling at the above heat treatment be conducted at a cooling rate of at least about 100° C./second. This rapid cooling can be accomplished by forced air cooling or forced water cooling. According to the present invention, it has been found that if the above-mentioned cooling rate condition is satisfied, VC solid-dissolved in the matrix metal can effectively be crystallized or deposited in the fine and uniform state.

During this cooling, the phase of vanadium carbide particles once fused in the matrix metal phase is crystallized and/or deposited. In the present invention, the so-treated product is further subjected to the heat treatment to repeat fusion. Namely, by this heat treatment, the first heat-treated product is fused and is then cooled, whereby the dispersion state of the phase of vanadium carbide particles is rendered further characteristic. By this heat treatment, the phase of vanadium carbide particles re-fused in the matrix metal phase are crystallized and/or deposited again. The phase of vanadium carbide particles of the corrosion-resistant and wear-resistant alloy of the present invention obtained by this recrystallization and/or redeposition is very fine and uniform. Namely, by repeating fusion and cooling a plurality of times, VC is completely dissolved and crystallized or deposited as the phase of fine particles, and the dispersion state of VC particles becomes very good.

More specifically, in the corrosion-resistant and wear-resistant alloy obtained by the series of the above-mentioned steps, the phase of uniform and fine vanadium carbide particles are recrystallized and/or redeposited in the matrix metal phase, and it is important that the grain size of this phase should be smaller than 10 μm and the area ratio of the vanadium carbide particle phase to the entire alloy phase should be at least 10%. If the grain size of the vanadium carbide particle phase exceeds 10 μm, the toughness of the alloy per se is reduced and the risk of falling of hard particles increases to inhibit the improvement of the wear resistance. If the area ratio of the vanadium carbide particle phase to the entire alloy phase is lower than 10%, the effect of improving the wear resistance is reduced and no good results can be obtained.

As the fusing means using a heat source having a high energy density, there can be used a fusing method using a plasma arc or laser beam heat source. Furthermore, a plasma powder welding method (P.T.A. method) using a plasma arc as the heat source is preferably adopted as the method for build-up welding of the above-mentioned alloy on the surface of a metal member as described hereinafter. If such fusing means are adopted, heating to a temperature exceeding 3000° C. is accomplished in a moment, and the above-mentioned powdery mixture can be effectively fused.

The carbide recrystallized and/or redeposited by carrying out the heat treatment a plurality of times is composed substantially of VC, but there is a possibility of formation of $V_2C$ as a subsidiary component. It is considered that (Fe, Cr, V, W)$_{23}$C$_6$ is further deposited as the trace component. In the present invention, the presence of these unavoidable components is permissible within the range not deviating from the scope of the present invention.

The method for modifying the surface of a metal member according to the present invention will now be described.

The surface modification method of the present invention is characterized, in principle, in that a built-up layer composed of the corrosion-resistant and wear-resistant alloy obtained by the above-mentioned method is applied to the surface of an intended metal member.

More specifically, the surface modification process of the present invention comprises supplying a powdery mixture comprising a powder of at least one matrix metal selected from the group consisting of Fe-based alloys, Co-based alloys and Ni-based alloys and a vanadium carbide powder to the surface of a base material constituting the metal member and subjecting the powdery mixture to a heat treatment using a heat source having a high energy density to repeat fusion and re-fusion of the powdery mixture, whereby a built-up alloy layer comprising a phase of uniform and fine vanadium carbide particles recrystallized and/or redeposited in the matrix metal phase is formed on the surface of the base material.

A known method can be adopted as the plasma powder welding method.

A plasma powder welding method (P.T.A. method) using a plasma arc as the heat source is preferably used for the above-mentioned heat treatment. As pointed out hereinbefore, by using such fusing means, heating to a temperature exceeding 3000° C. is attained in a moment, and the above-mentioned powdery mixture can be effectively fused. If the plasma powder welding method is adopted, the powder need not be supplied at the second heat treatment and it is sufficient if only heating is effectively performed. Accordingly, normal plasma heating is adopted.

The cooling conditions and the state of deposition or dispersion of the vanadium carbide particle phase are the same as described above. In order to realize a good crystallization or deposition state of the vanadium carbide particle phase, it is important that the cooling at the heat treatment should be carried out at a cooling rate of at least about 100° C./sec. This rapid cooling is accomplished by forced air cooling or forced water cooling. We confirmed that if this cooling speed condition is satisfied, VC solid-dissolved in the matrix metal can be crystallized or deposited in the fine and uniform state. It is expected that in order to prevent generation of cracking in the interface between the base material of the metal member and the built-up layer, a lower cooling speed is generally preferred. However, we confirmed that reduction of the cooling speed is not always effective for realizing the above-mentioned deposition state of the VC particle phase.

In the present invention, as the above-mentioned cooling method, there can be adopted a method in which the above-mentioned operation is carried out while forcibly cooling a target metal member on which a built-up layer is to be formed.

Figure 15A:
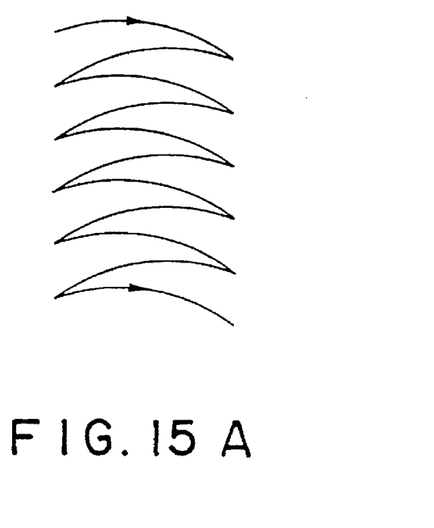
FIGS. 15A and 15B are diagrams illustrating weaving patterns.
Figure 15B:
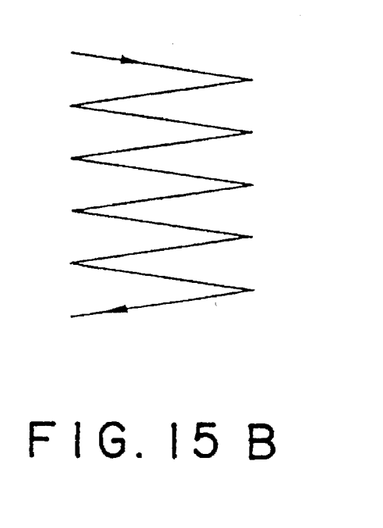

In the present invention, the above-mentioned heat treatment is repeated a plurality of times efficiently by using the weaving method. FIGS. 15A and 15B show examples of the torch weaving pattern in the formation of a built-up layer by using a plasma arc welding machine. The weaving may be a zig-zag (FIG. 15A) or arcuate (FIG. 15B) reciprocating motion, and any embodiment can be adopted if the above-mentioned heating fusion treatment is substantially conducted a plurality of times.

Figure 16:
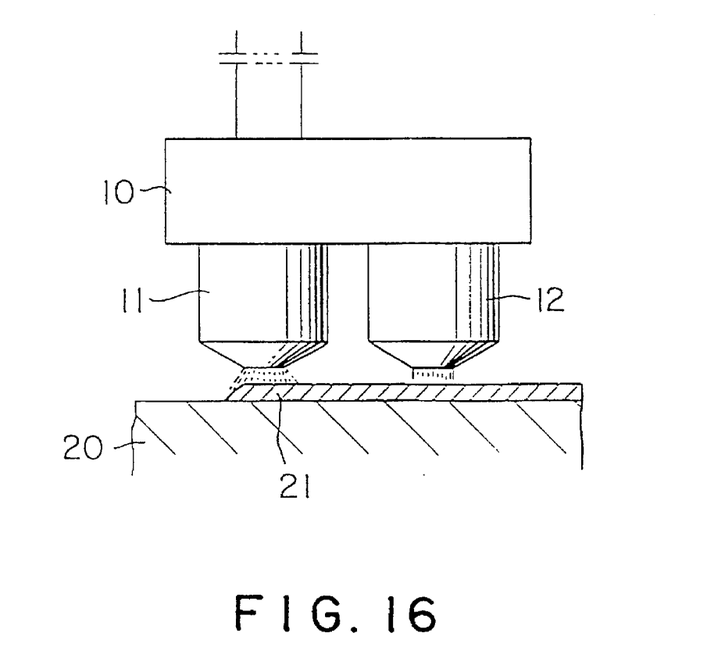
FIG. 16 is a diagram illustrating the outline of a double-torch plasma arc welding machine for use in carrying out the process of the present invention.

FIG. 16 is a diagram illustrating an embodiment in which a built-up layer is formed by using a plasma arc welding machine comprising two torches. In this plasma arc welding machine, a first torch 11 for effecting plasma powder welding, a powder feed pipe 13 for supplying the starting powder to the first torch and a second torch 12 for effecting only plasma arc heating are arranged in a torch body 10. By moving this plasma arc welding machine and a metal member 20 while maintaining an appropriate positional relationship between them, a built-up layer 21 composed of the above-mentioned corrosion-resistant and wear-resistant alloy can be formed.

The above-mentioned method for the surface modification of a metal member can be applied to a machine part in which good corrosion resistance, sliding characteristics and wear resistance are required for special portions.

For the surface modification of a constituent part of a machine, there has been adopted a method in which the surface of the metal part is treated by plating, CVD, PVD, surface cladding using a high-temperature heat source or surface alloying. For example, for improving the corrosion resistance and wear resistance of a screw of a plastics molding machine, there is generally adopted a method in which the screw is quenched to increase the hardness and the screw is then subjected to a plating treatment, or a PVD or CVD method. For a cylinder to be used in combination with the above-mentioned screw, there is generally adopted a method in which the inner surface of a cylinder composed of nitriding steel is subjected to a nitriding treatment, or a method in which the inner wall of the cylinder is entirely or partially coated with a self-fluxing alloy having excellent corrosion resistance and wear resistance or laminated with a liner of an alloy having excellent corrosion resistance and wear resistance.

In these conventional methods, however, since the adhesive force between the base material of the metal part and the modified surface layer is weak, peeling or cracking is often caused under a thermal load or under a relatively light load. Moreover, surface-modified parts obtained according to the conventional methods are not sufficiently satisfactory in the wear resistance. Especially in the case of a part of the above-mentioned plastics molding machine, in a portion where a starting plastic material moves (particularly the starting material feed portion), the wear by the action of the starting plastic material increases, and in the plastics injecting or extruding portion, corrosion damage by gas generated from the starting plastic material and wear damage under a high pressure become serious problems.

According to the above-mentioned method of the present invention for the surface modification of the metal member, the bonding force between the surface-modified layer and the base material is very good, and the surface layer has excellent corrosion resistance, sliding characteristics and wear resistance. Therefore, the method of the present invention is very valuable as the method for the surface modification of a metal member in which high corrosion resistance or wear resistance is required for a special portion, such as a part of the above-mentioned plastics molding machine.

The present invention will now be described in detail with reference to the following examples.

In Examples 1 through 6, a corrosion-resistant and wear-resistant alloy or a built-up layer was formed according to the weaving method, and in Examples 7 through 9, the operation was carried out by using a double-torch plasma arc welding machine.

EXAMPLE 1

VC powder (having an average particle size of 70 μm) was mixed at a weight ratio of 18%, 40% or 67% into a Co-based alloy powder (matrix metal powder) comprising 0.2% by weight of C, 0.6% by weight of Si, 26.5% by weight of Cr, 2.7% by weight of Ni, 5.4% by weight of Mo and 0.3% by weight of Fe, with the balance being substantially Co, to form a sample.

The sample of the powdery mixture was subjected to weaving of a small pitch by using a plasma powder welding machine to heat the powdery mixture to a temperature close to the melting point (about 2830° C.) of VC and effect fusion, whereby a corrosion-resistant and wear-resistant alloy of the present invention was prepared.

The hardness of the sample alloy was measured. The obtained results are shown in Table 1.

TABLE 1

| Sample No. | Mixing Ratio of VC (% by weight) | Hardness (Hv) |
| --- | --- | --- |
| 1 | 18 | 550–620 |
| 2 | 40 | 620–670 |
| 3 | 67 | 950–1150 |

Figure 1:
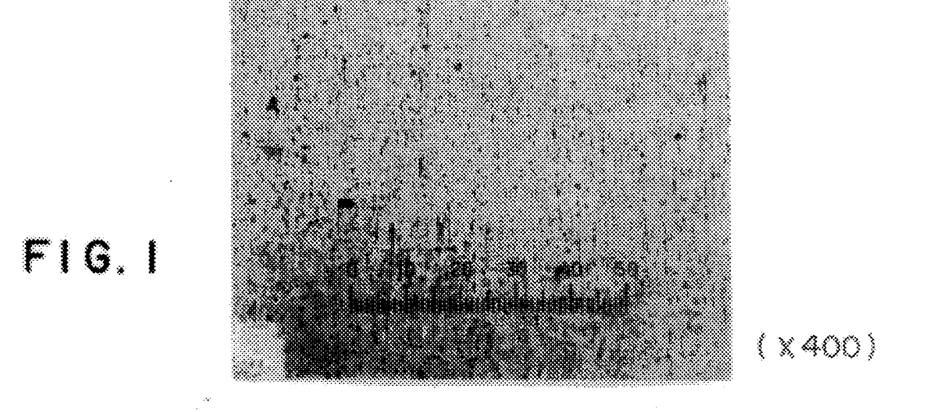
FIG. 1 is a microscope photo of a metal texture of a section of corrosion-resistant and wear-resistant alloy obtained in sample no. 1 of example 1 of the present invention.
Figure 2:
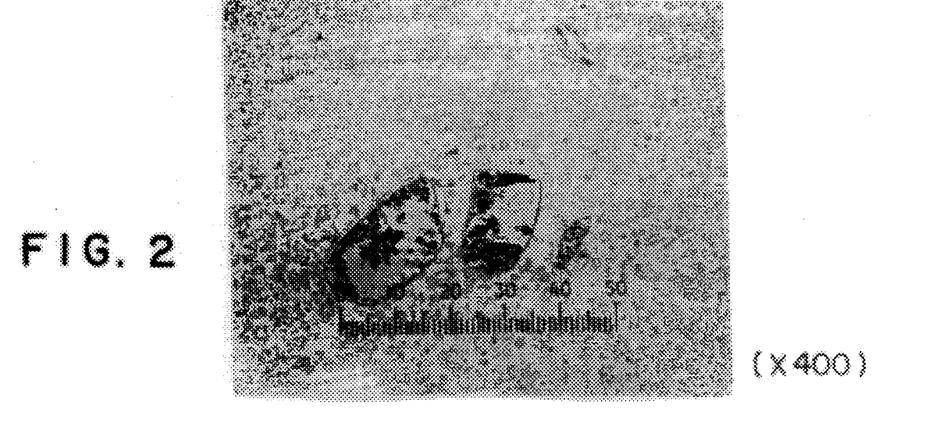
FIG. 2 is a microscope photo of a metal texture of a section of corrosion-resistant and wear-resistant alloy obtained in sample no. 2 of example 1 of the present invention.
Figure 3:
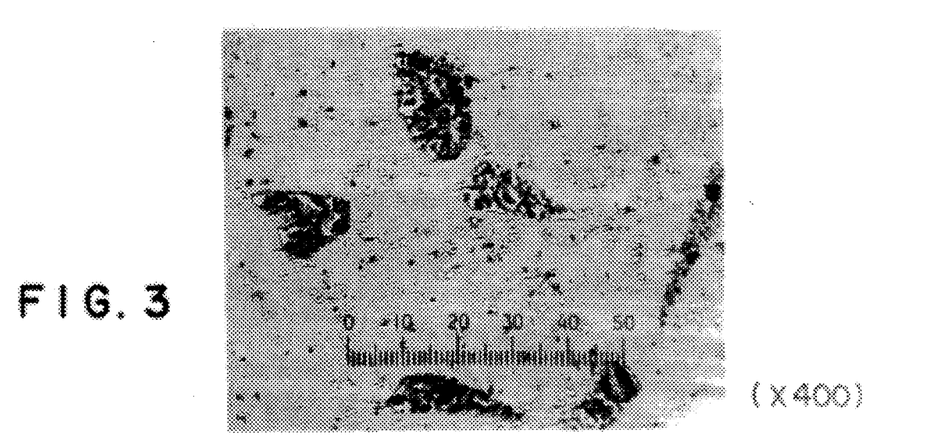
FIG. 3 is a microscope photo of a metal texture of a section of corrosion-resistant and wear-resistant alloy obtained in sample no. 3 of example 1 of the present invention.

FIGS. 1, 2 and 3 are microscope photos (400 magnifications) of metal textures of sample alloys 1, 2 and 3 obtained above. It is seen that in each metal texture, a fine VC particle phase (composed mainly of particles having a size smaller than about 3 μm) is uniformly distributed in the matrix metal phase.

Each alloy sample was subjected to the corrosion test using a 6N aqueous solution of hydrochloric acid or a 6N aqueous solution of nitric acid as the corroding solution. The obtained results are shown in Table 2.

TABLE 2

| | Corrosion Rate (mg/cm² · Hr) | |
| --- | --- | --- |
| Sample No. | aqueous solution of hydrochloric acid | aqueous solution of nitric acid |
| 1 | 0.08 | 0.09 |
| 2 | 0.07 | 0.09 |
| 3 | 0.09 | 0.11 |

Figure 6A:
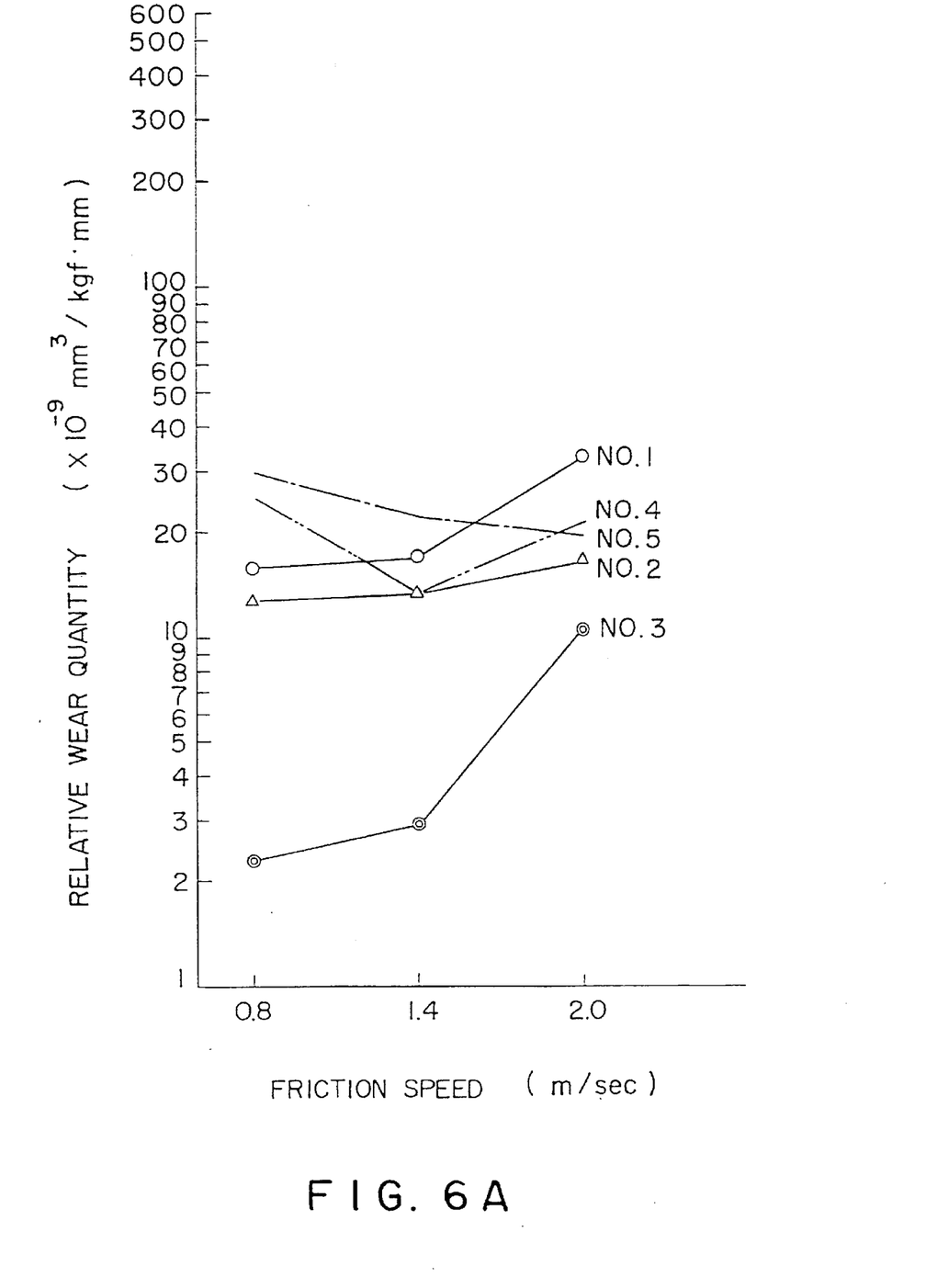
FIG. 6a is a graph showing the results of the abrasion test of examples 1 through 3 of the present invention.

Furthermore, each alloy sample was subjected to the wear test using an Ogoshi type abrasion tester and SKD-11 (HRC58) as the mating material under conditions of a final load of 18.9 kgf and an abrasion distance of 600M. The obtained results are shown in FIG. 6A. From the test results, it is seen that each of alloy samples 1, 2 and 3 of the present invention has a good wear resistance and with increase of the amount added of VC as hard particles, the wear resistance tends to be improved.

EXAMPLES 2

VC powder (having an average particle size of 70 μm) was mixed at a weight ratio of 7.5% into an Fe-based alloy powder (matrix metal powder) comprising 1.2% by weight of C, 0.6% by weight of Si, 0.3% by weight of Mn, 4.5% by weight of Cr, 5.1% by weight of Mo, 6.3% by weight of W, 3.1% by weight of V and 8.4% by weight of Co, with the balance being substantially Fe, to form a sample.

A corrosion-resistant and wear-resistant alloy was prepared in the same manner as described in Example 1 by using the obtained powdery mixture sample.

The obtained sample alloy had a hardness Hv of 950 to 1000. Accordingly, it was found that in the case where an Fe-based alloy is used as the matrix resin, even if the amount added of VC is about 7.5%, a hardness higher than the level attainable in case of a Co-based alloy can be obtained.

Figure 4:
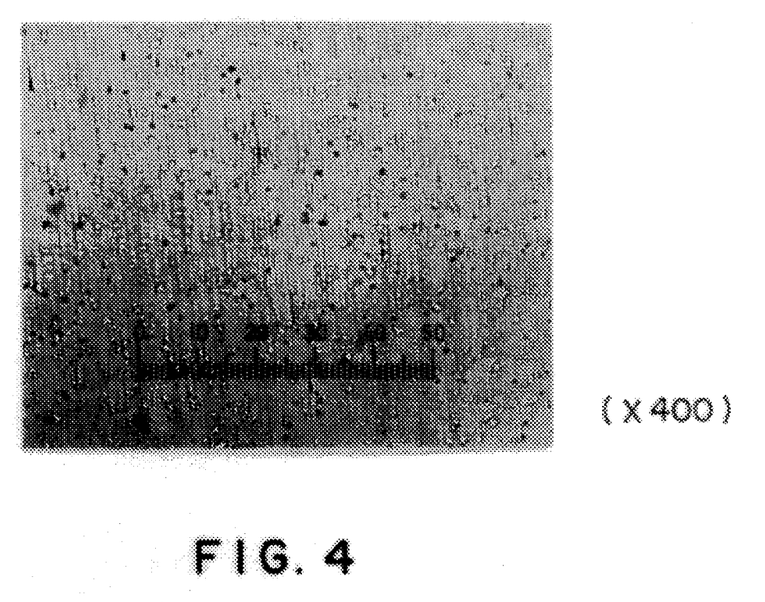
FIG. 4 is a microscope photo of a metal texture of a section of corrosion-resistant and wear-resistant alloy obtained in example 2 of the present invention.

FIG. 4 is a microscope photo (400 magnifications) of the metal texture of the sample alloy obtained in the present example. From this photo, it is seen that the phase of fine VC particles (having a size of about 20 μm) is uniformly distributed in the matrix metal phase.

This sample alloy (sample 4) was subjected to the corrosion test in the same manner as described in Example 1. The corrosion rate (mg/cm$^2$·Hr) was 0.05 in an aqueous solution of hydrochloric acid and 63.7 in an aqueous solution of nitric acid.

The sample alloy (sample 4) was subjected to the wear test by using an Ogoshi type abrasion tester and SKD-11 (HRC58) as the mating material under conditions of a final load of 18.9 kgf and an abrasion distance of 600M. The obtained results are shown in FIG. 6A. From the test results, it is seen that also this sample alloy has a good wear resistance.

EXAMPLE 3

VC powder (having an average particle size of 70 μm) was mixed at a weight ratio of 19% into an Ni-based alloy powder (matrix metal powder) comprising 0.042% by weight of C, 0.30% by weight of Si, 0.008% by weight of B, 20.50% by weight of Cr, 0.27% by weight of Fe, 0.29% by weight of Mn and 2.70% by weight of Ti, with the balance being substantially Ni, to form a sample.

A corrosion-resistant and wear-resistant alloy was prepared in the same manner as described in Example 1 by using the obtained powdery mixture sample and a plasma powder welding machine.

The obtained sample alloy had a hardness Hv of 510 to 590.

Figure 5:
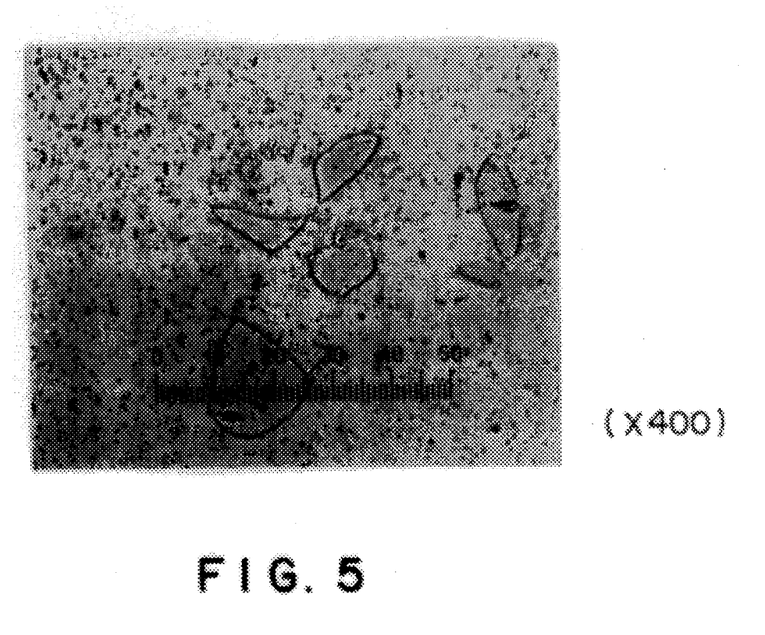
FIG. 5 is a microscope photo of a metal texture of a section of corrosion-resistant and wear-resistant alloy obtained in example 3 of the present invention.

FIG. 5 is a microscope photo (400 magnifications) of the metal texture of the sample alloy obtained in the present example. From this photo, it is seen that the phase of fine VC particles (having a size of about 3 μm) is uniformly distributed in the matrix metal phase.

This sample alloy (sample 5) was subjected to the corrosion test in the same manner as described in Example 1. The corrosion rate (mg/cm$^2$·Hr) was 0.07 in an aqueous solution of hydrochloric acid and 0.09 in an aqueous solution of nitric acid.

The sample alloy (sample 5) was subjected to the wear test by using an Ogoshi type abrasion tester and SKD-11 (HRC58) as the mating material under conditions of a final load of 18.9 kgf and an abrasion distance of 600M. The obtained results are shown in FIG. 6A. From the test results, it is seen that also this sample alloy has a good wear resistance.

Comparative Example

A matrix metal powder having a composition shown in Table 3 was mixed with a powder of hard particles shown in Table 3, and each powdery mixture sample was subjected to the weaving operation using a plasma powder welding machine under the same conditions as described in Example 1 and heated at a temperature higher than the melting point (about 2730° C.) of the hard powder to effect fusion. After the fusion, the sample was naturally cooled to obtain a hard particle-containing alloy.

With respect to each of the obtained sample alloys (samples A, B and C), the hardness was measured. As the result, it was found that the hardnesses (Hv) of the obtained sample alloys (samples A, B and C) were 550 to 600, 600 to 750 and 700 to 970, respectively.

TABLE 3

| Sample | Composition (% by weight) | Hard Particles (% by weight) |
|---|---|---|
| A | 0.3Si, 20.5Cr, 0.3Fe, 1.5Al, 2.7Ti, 0.3Mn, balance Ni | Cr$_2$C$_2$, 50% |
| B | 0.6Si, 26.5Cr, 0.3Fe, 0.2C, 2.7Ni, 5.4Mo, balance Co | NbC, 50% |
| C | 0.47C, 0.35Si, 0.4Mn, 1.4Cr, 0.21Mo, 0.9Al, balance Fe | nitrided |

The obtained samples were subjected to the corrosion test in the same manner as described in Example 1. The obtained results are shown in Table 4.

TABLE 4

| | Corrosion Rate (mg/cm$^2$ · Hr) | |
|---|---|---|
| Sample No. | aqueous solution of hydrochloric acid | aqueous solution of nitric acid |
| A | 0.01 | 0.01 |
| B | 0.03 | 0.08 |
| C | 14.5 | 217 |

Figure 6B:
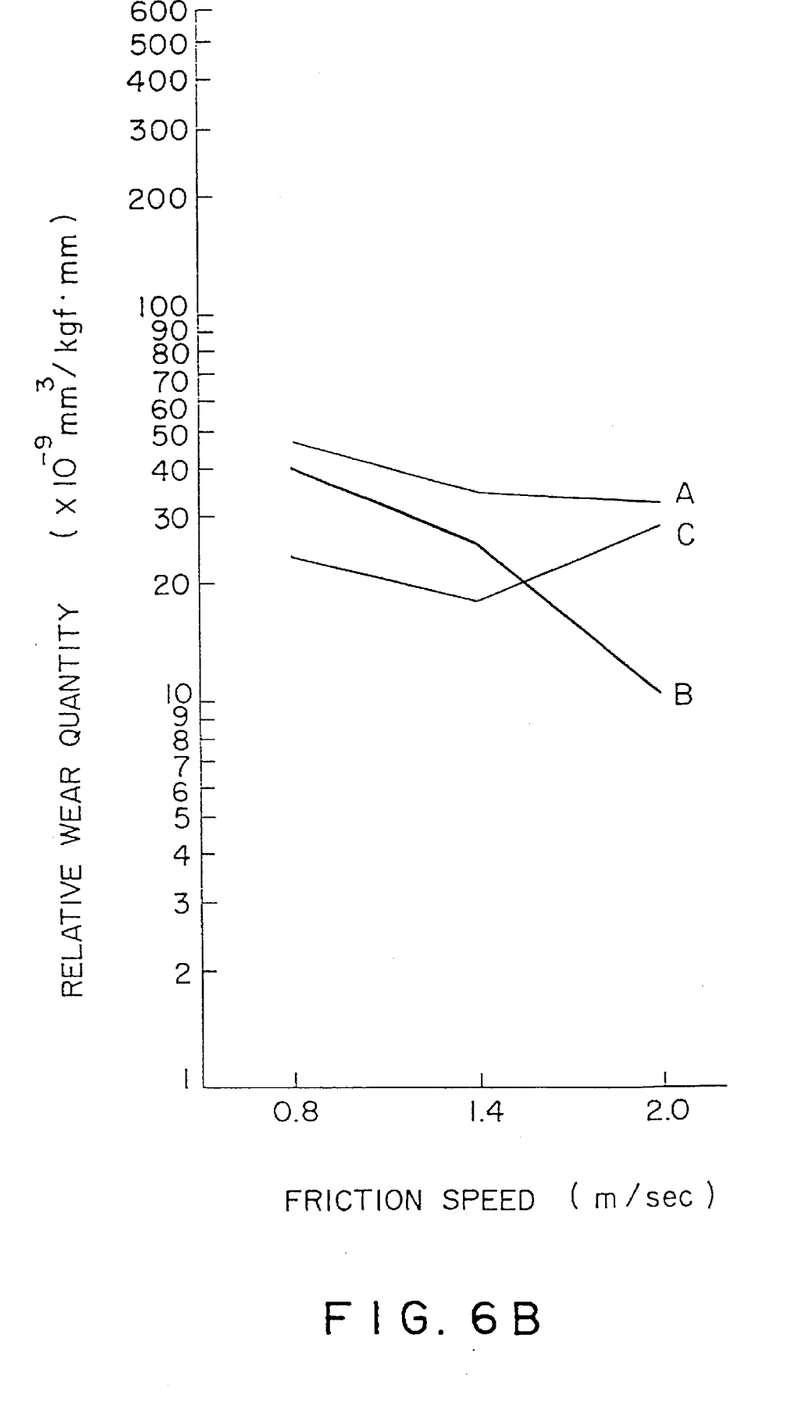
FIG. 6b is a graph showing the results of the abrasion test of samples A, B, and C of comparative example 3 of the present invention.

Furthermore, these samples A, B and C were subjected to the wear test in the same manner as described in Example 1. The obtained results are shown in FIG. 6B.

EXAMPLE 4

A powder composed mainly of VC (having an average particle size of 70 μm) was mixed at a weight ratio of 18%, 40% or 67% into a powder of a Co-based alloy having a chemical composition comprising 0.15 to 0.35% by weight of C, 0.90 to 1.30% by weight of Si, up to 1.00% by weight of Mn, up to 0.030% by weight of P, up to 0.030% by weight of S, 2.50 to 3.50% by weight of Ni, 24.0 to 28.0% by weight of Cr, 5.00 to 6.00% by weight of Mo and up to 1.50% by weight of Fe, with the balance being Co, to form a sample.

The powdery mixture was subjected to build-up welding on a steel material (SDM440) by weaving using a plasma powder welding machine to form a built-up layer of a corrosion-resistance and wear-resistant alloy layer on the surface of the steel material. The operation conditions of the plasma powder welding were as follows:

current of 125 A, voltage of 40 V, plasma gas feed rate of 1.4 l/min, shield gas feed rate of 16 l/min, powder gas feed rate of 3.1 l/min, powder feed rate of 11.8 g/min, weaving frequency of 46 weavings per minute, weaving width of 7 mm, welding speed of 80 mm/min and extension of 8 mm The particle size of the powder fed in the present example was in the range of from 160 to 250 mesh, and the peak of the particle size distribution was –200 mesh.

Figure 7:
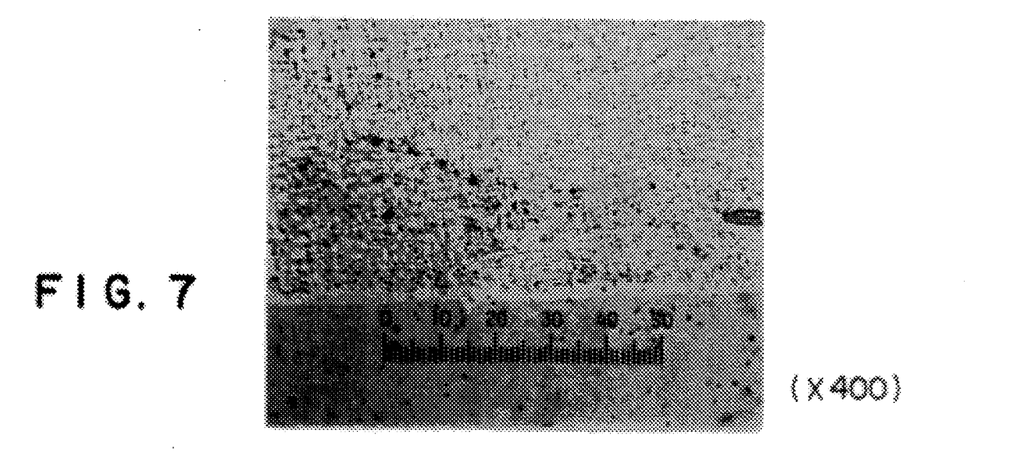
FIG. 7 is a microscope photo of metal texture of a section of a metal member, having 18% by weight VC, surface-modified according to the process of the present invention in example 4.
Figure 8:
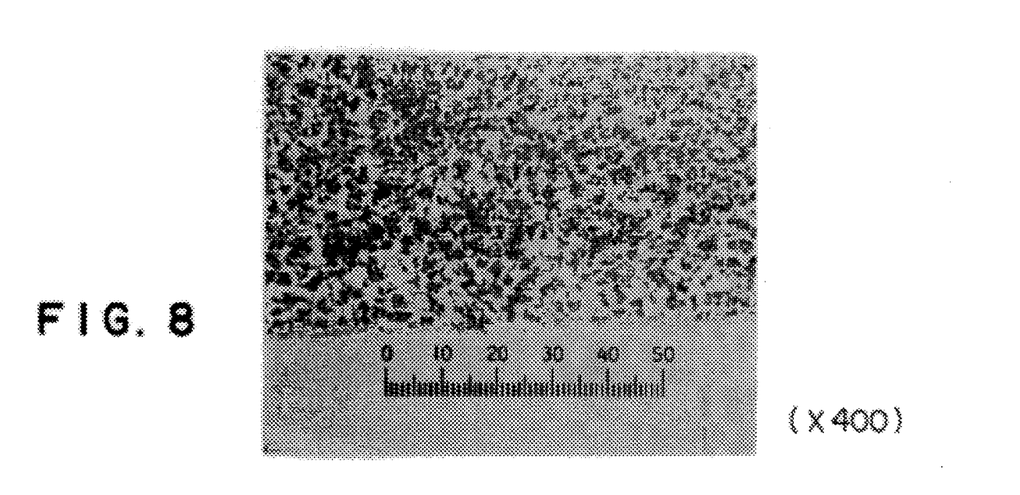
FIG. 8 is a microscope photo of metal texture of a section of a metal member, having 40% by weight VC, surface-modified according to the process of the present invention in example 4.
Figure 9:
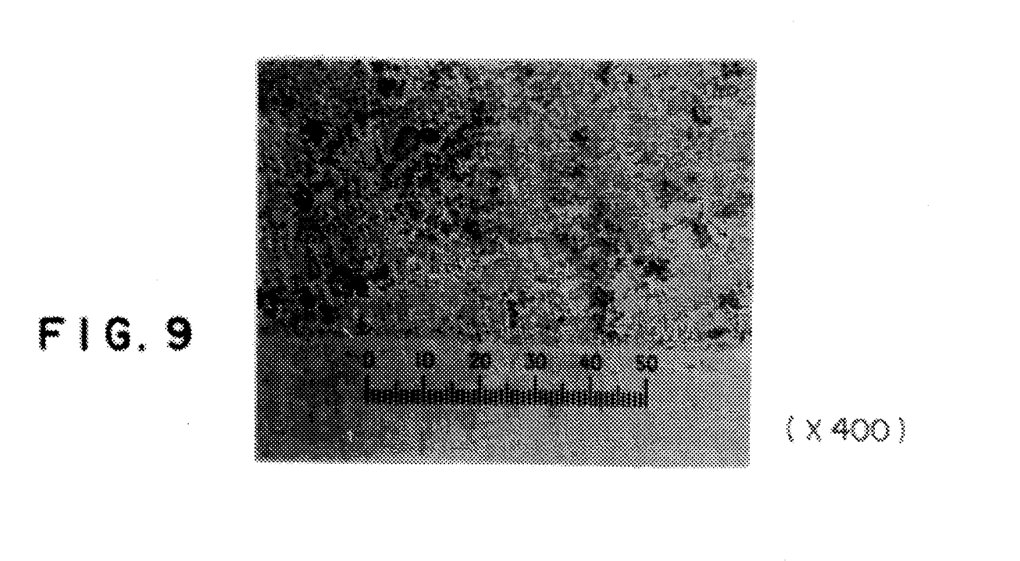
FIG. 9 is a microscope photo of metal texture of a section of a metal member, having 67% by weight VC, surface-modified according to the process of the present invention in example 4.

FIGS. 7 through 9 (corresponding to VC contents of 18% by weight, 40% by weight and 67% by weight, respectively) are microscope photos (400 magnifications) of the metal textures of sections of the built-up welded portions obtained above.

With respect to each of the obtained surface-modified metal members, the peel strength and shear strength were measured. The obtained results are shown in Table 5.

TABLE 5

| Amount Added of VC (% by weight) | Peel Strength (kgf/mm$^2$) | Shear Strength (kgf/mm$^2$) |
| --- | --- | --- |
| 18 | 39.4 | 47.9 |
| 40 | 33.9 | 38.7 |
| 67 | 30.1 | 36.2 |

Figure 10:
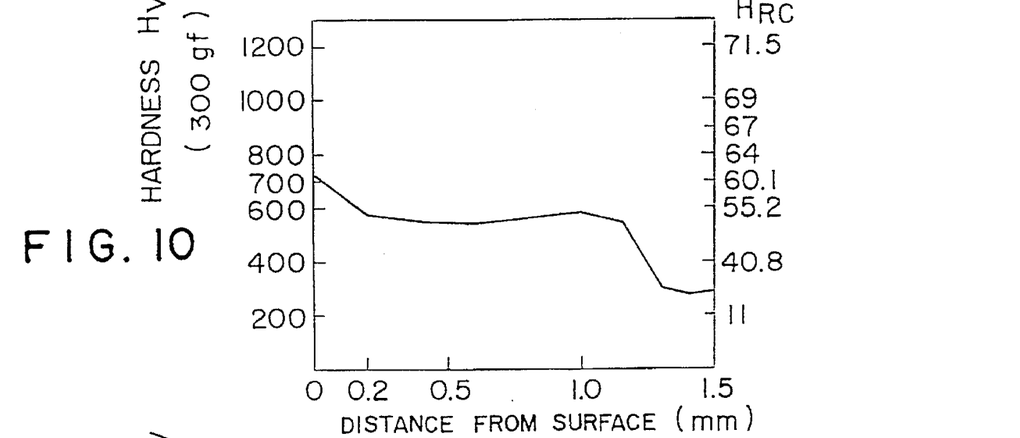
FIG. 10 is a graph showing the results of the measurement of the hardness of FIG. 7 member surface-modified according to the process of the present invention.
Figure 11:
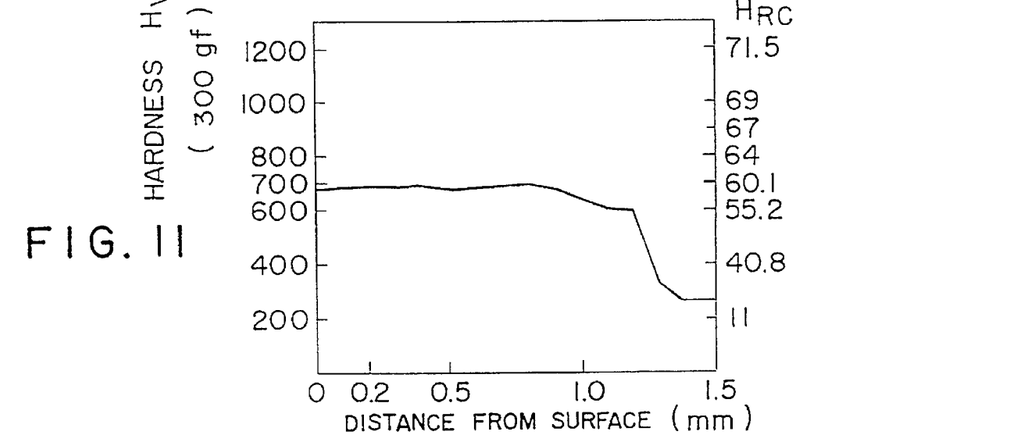
FIG. 11 is a graph showing the results of the measurement of the hardness of FIG. 8 member surface-modified according to the process of the present invention.
Figure 12:
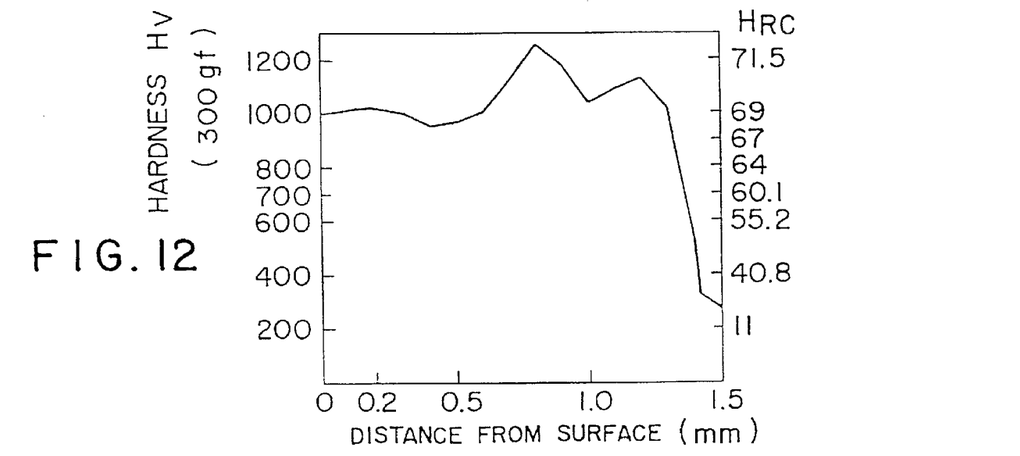
FIG. 12 is a graph showing the results of the measurement of the hardness of FIG. 9 member surface-modified according to the process of the present invention.

The results of the hardness measurement of the above surface-modified metal members are shown in FIGS. 10 through 12 (corresponding to the VC contents of 18% by weight, 40% by weight and 67% by weight, respectively).

The results of the corrosion test were similar to those obtained in Example 1.

From the foregoing test results, it is seen that the metal member according to the present invention is excellent in that (1) the insufficient bonding strength between the substrate and the built-up welded portion, which is a serious problem in the conventional techniques, and (2) the reduction of the wear resistance caused by coarsening of added particles or deviation of the distribution are overcome.

EXAMPLE 5

Figure 13:
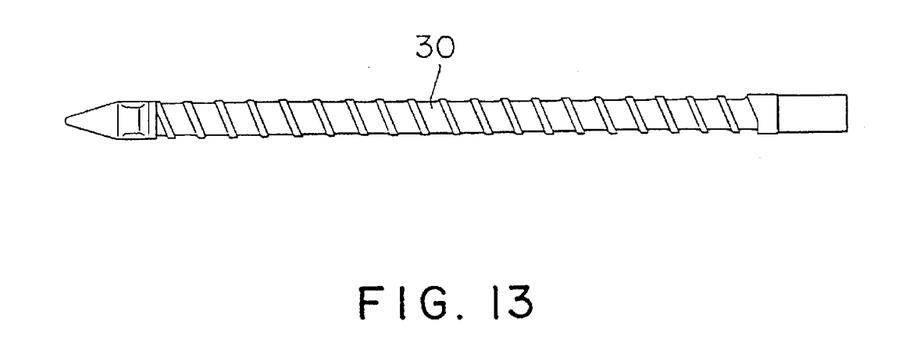
FIG. 13 is a perspective view of an injection molding screw to be surface-modified in the examples of the present invention.

A surface-modified screw for injection molding was prepared by using the same materials as used in Example 4 in the same manner as described in Example 4. FIG. 13 is a perspective view illustrating this screw 30 for injection molding. The obtained screw for injection molding and a comparative screw for injection molding, which was prepared according to the conventional technique by quench hardening and hard chromium plating of the surface were subjected to the actual operation test. At the life test, the life ratio of the screw the present invention to the screw surface-modified by the conventional method was calculated. It was found that the life ratio of the screw for injection molding according to the present invention was 2.3, while the life ratio of the comparative screw for injection molding obtained according to the conventional method was 1.0.

As is apparent from the foregoing test results, the screw for injection molding according to the present invention is highly improved in the life over the conventional screw.

EXAMPLE 6

A surface-modified cylinder for injection molding was prepared by using the same materials as used in Example 4 in the same manner as described in Example 4.

Figure 14:
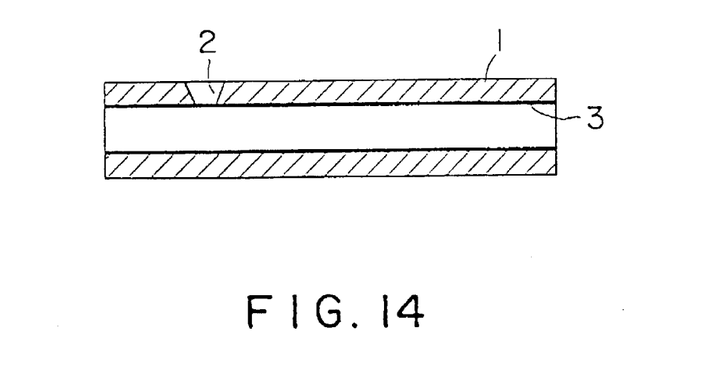
FIG. 14 is a sectional view of an injection molding cylinder to be surface-modified in the examples of the present invention.

FIG. 14 is a sectional view illustrating this screw for injection molding. In FIG. 14, reference numeral 1 represents a cylinder proper, reference numeral 2 represents a starting plastics feed opening, and reference numeral 3 represents an inner wall of the cylinder to be surface-treated.

The obtained cylinder for injection molding and a comparative cylinder of SACM645 for injection molding, which was prepared according to the conventional technique by the nitriding treatment of the inner surface were subjected to the actual operation test. At the life test, the life ratio of the cylinder of the present invention to the cylinder surface-modified by the conventional method was calculated. It was found that the life ratio of the cylinder for injection molding according to the present invention was 2.1, while the life ratio of the comparative cylinder for injection molding obtained according to the conventional method was 1.0.

As is apparent from the foregoing test results, the cylinder for injection molding according to the present invention is highly improved in the life over the conventional cylinder.

EXAMPLE 7

VC powder (having an average particle size of 70 μm) was mixed at a weight ratio of 40% into a Co-based alloy powder (matrix metal powder) comprising 0.2% by weight of C, 0.6% by weight of Si, 26.5% by weight of Cr, 2.7% by weight of Ni, 5.4% by weight of Mo and 0.3% by weight of Fe, with the balance being substantially Co, to form a sample.

A corrosion-resistant and wear-resistant alloy of the present invention was prepared from the powdery mixture by using a double-torch plasma powder welding machine shown in FIG. 16. The cooling speed was controlled to at least 100° C./sec.

The measured value of hardness HCR of the obtained sample alloy was 60 to 65.

Figure 17:
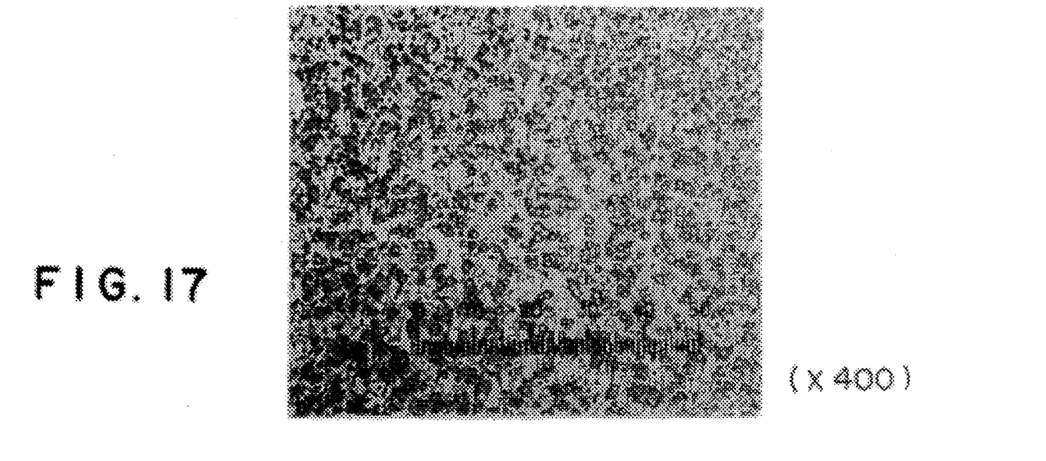
FIG. 17 is a microscope photo of a metal texture of a section of corrosion-resistant and wear-resistant alloy obtained in example 7 of the present invention.

FIG. 17 is a microscope photo (400 magnifications) of the metal texture of the sample alloy obtained in the present example. From this photo, it is seen that the phase of fine VC particles (having a size less than 5 μm) is uniformly distributed in the matrix metal phase.

This sample alloy was subjected to the corrosion test using a 6N aqueous solution of hydrochloric acid and a 6N aqueous solution of nitric acid as the corroding solution. The obtained results are shown in Table 6.

TABLE 6

| Corrosion Rate (mg/cm$^2$ · Hr) | |
| --- | --- |
| aqueous solution of hydrochloric acid | aqueous solution of nitric acid |
| 0.02 | 0.09 |

Figure 20:
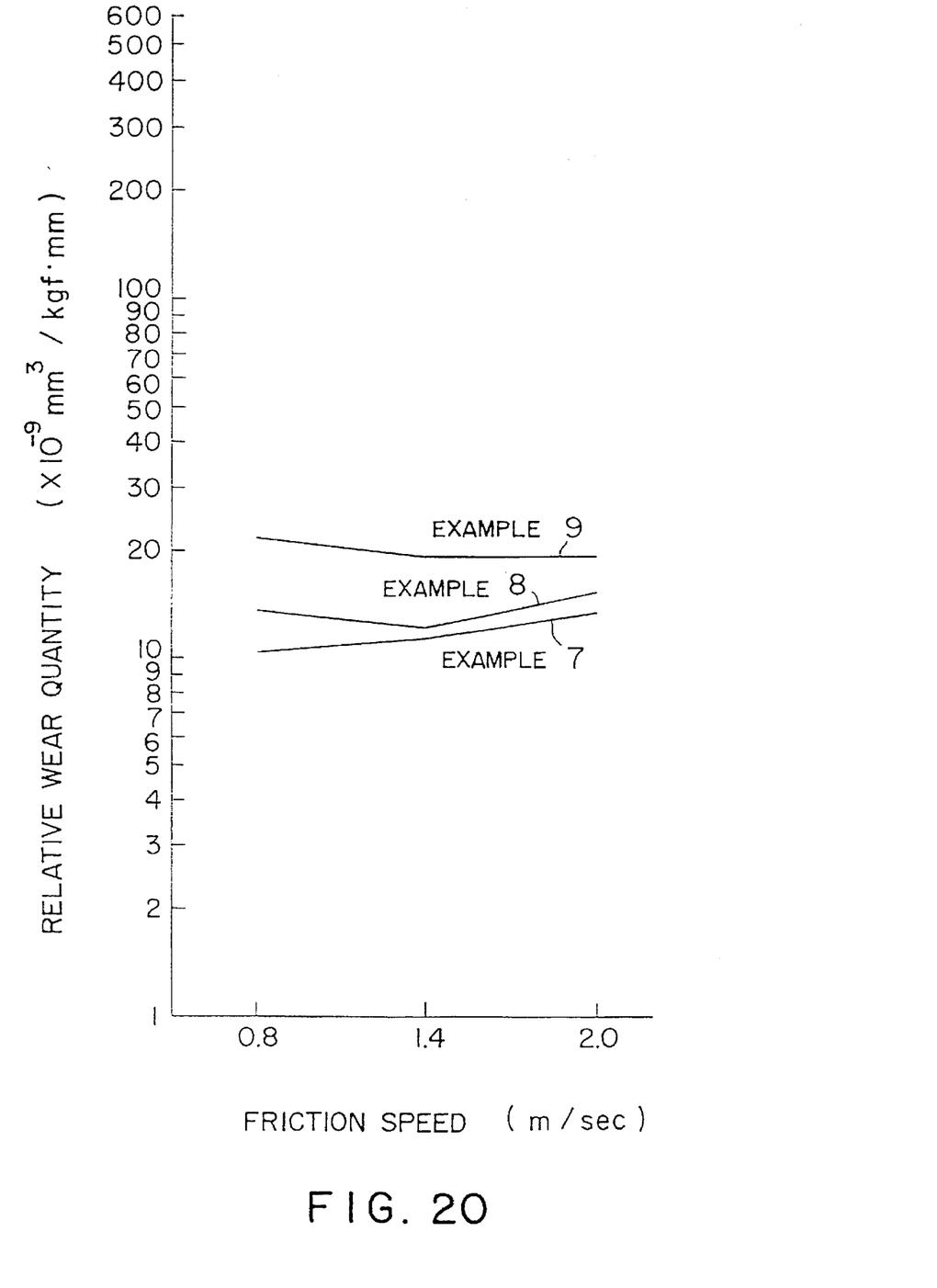
FIG. 20 is a graph showing the results of the abrasion test of examples 7 through 9 of the present invention.

The sample alloy was subjected to the wear test by using an Ogoshi type abrasion tester and SKD-11 (HRC58) as the mating material under conditions of a final load of 18.9 kgf and an abrasion distance of 600M. The obtained results are shown in FIG. 20. From the test results, it is seen that this sample alloy of the present invention has a good wear resistance.

EXAMPLE 8

An alloy of the present invention was prepared from the same Fe-based alloy and VC powder as used in Example 2 by using the double-torch plasma powder welding machine shown in FIG. 16.

The measured value of hardness HCR of the sample alloy was 65.

Figure 18:
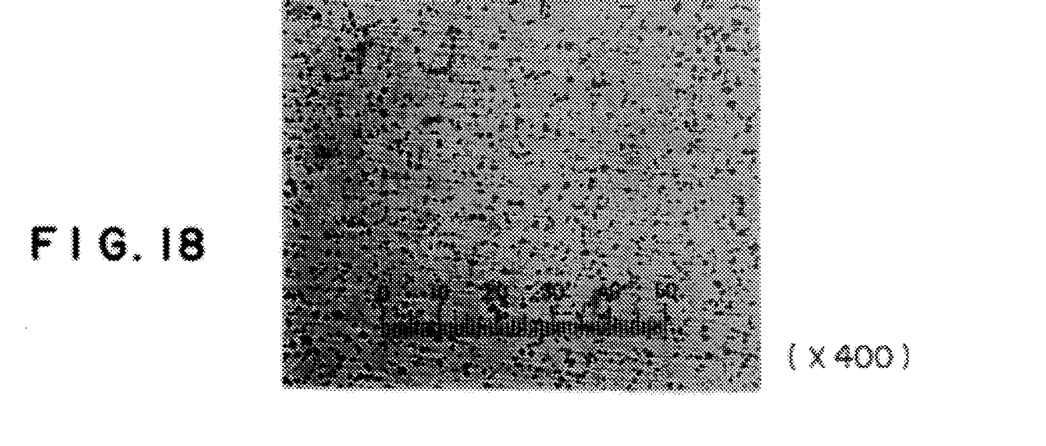
FIG. 18 is a microscope photo of a metal texture of a section of corrosion-resistant and wear-resistant alloy obtained in example 8 of the present invention.

FIG. 18 is a microscope photo (400 magnifications) of the metal texture of the obtained alloy. It is seen that the phase of fine VC particles (composed mainly of particles having a size smaller than 3 μm) is uniformly distributed in the matrix metal phase.

At the corrosion test, the corrosion rate in a 6N aqueous solution of hydrochloric acid was 0.06 mg/cm$^2$·Hr, and the results of the abrasion test conducted under the same conditions as described in Example 7 by using an Ogoshi type abrasion tester are shown in FIG. 20.

EXAMPLE 9

An alloy of the present invention was prepared from the same Ni-based alloy and VC powder as used in Example 3 by using the double-torch plasma powder welding machine shown in FIG. 16.

The measured value of hardness HCR of the sample alloy was 55.

Figure 19:
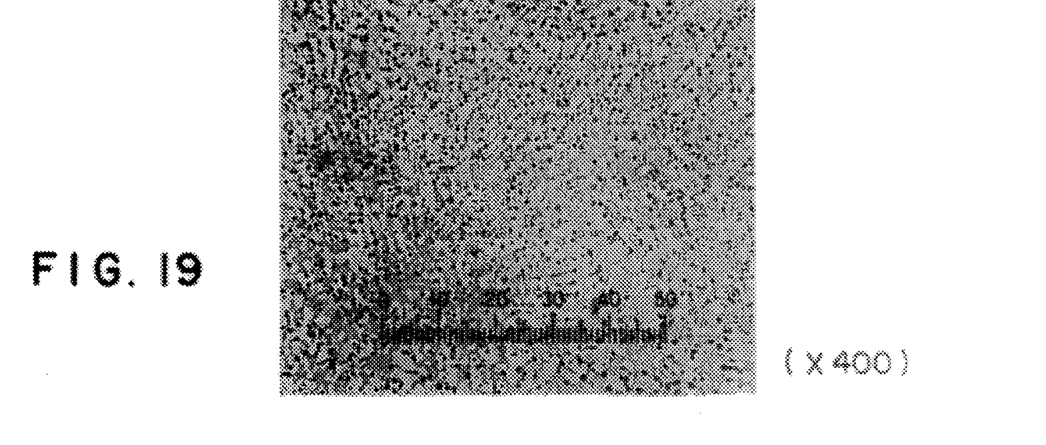
FIG. 19 is a microscope photo of a metal texture of a section of corrosion-resistant and wear-resistant alloy obtained in example 9 of the present invention.

FIG. 19 is a microscope photo (400 magnifications) of the metal texture of the obtained alloy. It is seen that the phase of fine VC particles (composed mainly of particles having a size smaller than about 10 μm) is uniformly distributed in the matrix metal phase.

The results of the abrasion test conducted in the same manner as described in Example 7 are shown in FIG. 20.

The corrosion rate in a 6N aqueous solution of hydrochloric acid was 0.01 mg/cm$^2$·Hr and the corrosion rate in a 6N aqueous solution of nitric acid was 0.07 mg/cm$^2$·Hr.

INDUSTRIAL APPLICABILITY

The process of the present invention can be widely applied as means for improving the corrosion resistance and wear resistance in metal members constituting various machines and apparatuses.

We claim:

1. A process for producing a surface-modified metal member having improved corrosion resistance and wear resistance, comprising the steps of:

supplying a powdery mixture consisting essentially of a powder of at least one matrix metal selected from the group consisting of Fe-based alloys, Co-based alloys and Ni-based alloys and a vanadium carbide powder to the surface of a base material constituting the metal member, in the case where said matrix metal comprises Fe-based alloys, said vanadium carbide powder being incorporated in an amount of up to 10% by weight, in the case where said matrix metal comprises Co-based alloys or Ni-based alloys, said vanadium carbide powder being incorporated, respectively, in an amount of up to 70% by weight; and heat treating the powdery mixture by heating it to at least the melting point of said vanadium carbide, thereby forming a built-up alloy layer on the surface of the base material, the heat treating comprising the steps of:

weaving a plasma arc thereby to repeatedly fuse said powdery mixture and the surface of the base material, and cooling them to form the built-up alloy layer on the surface of the base material and re-fusing the thus formed built-up alloy layer so as to form a phase of uniform and fine vanadium carbide particles recrystallized and redeposited in the matrix metal phase, said cooling being carried out at a cooling speed of at least about 100° C./sec, the particle size of said uniform and fine vanadium carbide particle phase recrystallized and redeposited in the matrix metal phase being smaller than 10 μm and an area ratio of the vanadium carbide particle phase to the entire alloy phase of the built-up alloy layer being at least 10%.

2. A process according to claim 1, wherein each cooling step is carried out by forced air cooling.

3. A process according to claim 1, wherein each cooling step is carried out by forced water cooling.

4. A process for producing a surface-modified metal member having improved corrosion resistance and wear resistance comprising the steps of:

supplying a powdery mixture consisting essentially of a powder of at least one matrix metal selected from the group consisting of Fe-based alloys, Co-based alloys and Ni-based alloys and a vanadium carbide powder to the surface of a base material constituting the metal member, in the case where said matrix metal comprises Fe-based alloys, said vanadium carbide powder being incorporated in an amount of up to 10% by weight, in the case where said matrix metal comprises Co-based alloys or Ni-based alloys, said vanadium carbide powder being incorporated, respectively, in an amount of up to 70% by weight; and heat treating the powdery mixture by heating it to at least the melting point of said vanadium carbide, thereby forming a built-up alloy layer on the surface of the base material, the heat treating comprising the following steps (a) and (b):

(a) fusing the powdery mixture and the surface of the base material, by using a first heat source, and cooling them thereby to form the built-up alloy layer on the surface of the base material, and (b) re-fusing the thus formed built-up alloy layer and the surface of the base material, by using a second heat source, and cooling them so as to form a phase of uniform and fine vanadium carbide particles recrystallized and redeposited in the matrix metal phase, each cooling step being carried out at a cooling speed of at least about 100° C./sec, the particle size of said uniform and fine vanadium carbide particle phase recrystallized and redeposited in the matrix metal phase being smaller than 10 μm and an area ratio of the vanadium carbide particle phase to the entire alloy phase of the built-up alloy layer being at least 10%.

5. A process according to claim 4, wherein each cooling step is carried out by forced air cooling.

6. A process according to claim 4, wherein each cooling step is carried out by forced water cooling.

* * * * *